United States Patent Office 3,479,246
Patented Nov. 18, 1969

3,479,246
CATALYZED ROOM TEMPERATURE CURING
SHELF STABLE SEALANT COMPOSITIONS
John R. Stapleton, 1017 Elmwood,
Wilmette, Ill. 60091
No Drawing. Continuation-in-part of application Ser. No.
524,211, Feb. 1, 1966, which is a continuation-in-part
of application Ser. No. 517,321, Dec. 29, 1965. This
application Aug. 8, 1967, Ser. No. 659,020
Int. Cl. C09j 3/14; B32b 15/02
U.S. Cl. 161—218       17 Claims

ABSTRACT OF THE DISCLOSURE

Sealant composition containing liquid room temperature reactive monomer-peroxide mixtures such as polyethylene glycol dimethacrylate and di t-butyl diperphthalate mixtures which form a strong adhesive bond between closely facing metal surfaces at room temperature and yet are stable under storage conditions and which can also contain accelerators and co-accelerators such as ethoxyethoxyethoxypropyl amine and saccharin; method of bonding metal surfaces and the resulting bonded structure using the sealant composition.

BACKGROUND OF THE INVENTION

Field of the invention

This application is a continuation-in-part of copending application Ser. No. 524,211, now abandoned, entitled "Sealant for Elevated Temperature Use," filed Feb. 1, 1966, which is in turn a continuation-in-part of copending application Ser. No. 517,321, now abandoned, entitled "Adhesive Composition for Metals and the Like," filed Dec. 29, 1965.

This invention pertains to the new use of certain catalytic agents combined with a room temperature reactive acrylic monomer for purposes of sealing closely faced metal surfaces.

Prior art

Shelf stable metal sealant compositions have been formulated for the purpose of bonding closely facing metal surfaces, e.g., threaded joints, in a full range of varying strengths, viscosity, thixotrophy and setting rates. Such sealing compositions usually include a room temperature reactive acrylic monomer, which is capable of being cured at room temperature within a desired period of time, a hydroperoxide or a formamide catalyst, and other additive compositions such as accelerators, promoters and inhibitors. For example, the room temperature reactive acrylic monomer may be an acrylic ester of ethylene glycol, e.g., a polyethylene glycol as described by L. W. Kalinowski in U.S. Patent No. 3,249,656 entitled "Sealant Composition," issued May 3, 1966; an acrylic ester of a cyclic ether alcohol as described by J. R. Stapleton in application Ser. No. 517, 321, entitled "Adhesive Composition for Metals and the Like," filed Dec. 29, 1965, now abandoned; an acrylic ester of an amino alcohol also described by C. Rai in application Ser. No. 561,381, entitled "Metal Sealant Containing Amino Acrylic Ester," filed June 29, 1966; and/or mixtures of the above with each other or with other vinylic monomers such as allylic monomers. The disclosure of monomers described in the above-identified patent and applications are hereby incorporated in this application.

According to the above applications Ser. No. 517,321, and Ser. No. 524,211, the acrylic ester of a cyclic ether alcohol can be readily prepared by esterifying the alcohol with an acrylic acid, e.g. substituted acrylic acid such as methacrylic, ethacrylic, chloroacrylic, and like acids, by known esterification reactions under conventional conditions for such esterifications. When conducting the esterification, it is normal to include an inhibitor such as hydroquinones to suppress reaction, e.g. polymerization, of the unsaturated group of the acrylic acid. It is also usual to conduct the esterification in the absence of oxygen, e.g. under a blanket of inert gas such as nitrogen or carbon dioxide or while bubbling inert gas through the reaction mass. Esterification catalysts such as toluene sulfonic acid can also be used. A particular ester, as desired, can be ordered from stock or can be prepared by chemical supply houses or laboratories specializing in such preparations. One such ester which is especially useful is tetrahydrofurfuryl methacrylate which is commercially available as Resin SR–203 from Sartomer Resins, Inc., Essington, Pa. This ester, as supplied, contains 60 p.p.m. hydroquinone as an inhibitor and is reported to have the following structural formula:

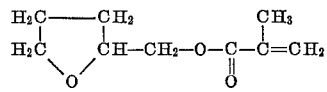

and the following specifications:

Color, APHA _____ 100
Molecular weight _____ 170
Refractive Index $N_d^{25}$ _____ 1.4554
Density at 25° C. _____c.p.s__ 2.5
Shrinkage on polymerization _____percent__ 12.5

The acrylic esters of cyclic ether alcohols are the esters of an acrylic acid of the structure $$CH_2=C(R)COOH$$

and a cyclic ether alcohol, and the esters include, but are not limited to, the acrylic esters of such alcohols as furfuryl alcohol, tetrahydrofurfuryl alcohol, furfurylidene methanol, 5-hydroxy - 2(hydroxymethyl) - 1,4 - pyrone, methyl isosaccharate, 2,5-dihydroxy-pyrone, 4-benzofurylhexanol, 2-hydroxyethyl-chromone, 2-hydroxymethyl-1,3-dioxane, 2-hydroxy-1,4-dioxane, 2-hydroxymethyl-1,3-dioxalane, 1-hydroxy-2,3-epoxypropane, 1-hydroxyethoxy-2,3 - epoxypropane, 1,2 - epoxy - 2 - hydroxymethyl - 3-hydroxypropane, 3,7,3',4'-tetrahydroxyflavone, 2,4,6-trihydroxymethyl-1, 3,5-trioxane, 2-hydroxybenzoxazole, etc. The esters can be mono-, di-, tri-, tetra-, etc., esters, but the mono- and di-esters are preferred. The cyclic ether alcohols include the structure C—O—C in the cyclic ether portion, wherein the carbon atoms form at least part of an interconnecting linking chain. The linking chain can be saturated or unsaturated, substituted or usubstituted, and can be formed in part or in whole as portions of one or more cyclic, e.g. aromatic, nuclei. In an advantageous form, the cyclic ether portion is hydrocarbon, hydrocarbon ether, or hydroxy substituted hydrocarbon or hydrocarbon ether, e.g. substituted with hydroxy groups attached directly to the chain or to a substituent hydrocarbon group on the chain; in such form the cyclic ether portion can be illustrated as containing the structure:

wherein X denotes a direct bond between the two carbon atoms or a linking chain in which the backbone of the chain is composed of carbon atoms alone or carbon atoms plus ether oxygen atoms. Preferably, the cyclic ether portion is tetrahydrofurfuryl and the preferred esters are tetrahydrofurfuryl acrylate, tetrahydrofurfuryl methacrylate, tetrahydrofurfuryl ethacrylate, and tetrahydrofurfuryl chloroacrylate.

Further, advantageous results are obtained when the acrylic ester of the cyclic ether alcohol is furfurylacrylate, furfurylidene methylethacrylate, the dimethacrylate of 5-hydroxy-2(hydroxymethyl) - 1,4 - pyrone, the diacrylate of tetrahydro - 3,4 - dihydroxy - 2,5 - dicarboxymethyl furan, 2,5-dihydroxy pyrone chloroacrylate, 2-hydroxymethyl dioxane methacrylate, 2,3 - epoxypropyl methacrylate, and other acrylic esters of cyclic ether alcohols.

According to the above Kalinowski patent, the room temperature reactive acrylic monomer is an ester of an acrylic acid or substituted acrylic acid, such as hydrocarbon and/or halogen substituted such acid, and a polyhydric alcohol. Such esters are well known and the examples below are given merely as a guide to those in the art, it being understood that a variety of such esters may be used as will be recognized by those in the art. Examples include ethylene glycol dimethacrylate, diethylene glycol dimethacrylate, triethylene glycol dimethacrylate, tetraethylene glycol dimethylacrylate, polyethylene glycol dimethacrylate, dipropylene glycol dimethacrylate, tetraethylene glycol diacrylate, tetraethylene glycol dichloracrylate, glycerol trimethacrylate, and pentaerythritol tetramethacrylate. A suitable polyethylene glycol dimethacrylate is available under the trade designation SR–210 from Sartomer Resins, Inc., Essington, Pennsylvania, and averages tetraethylene glycol dimethacrylate. The esters may be used singly or in combination and need not be highly purified. Commercial grades of the esters are entirely satisfactory.

The preferred acrylic monomers are the normally liquid poly-esters, including di-, tri-, tetra-, etc., esters, of an acrylic acid and a polyhydric alcohol in which the acrylic acid has the formula $CH_2=C(R)—COOH$, where R is a group selected from the class consisting of hydrogen, lower alkyl (especially methyl), and halogen (especially chlorine) and the polyhydric alcohol is an open chain polyol, such as one having the formula $R(OH)_x$ wherein $x$ is at least 2 and preferably 2 to 4 and R is an alkyl or alkoxy group. Such polyols include, but are not limited to, the di-, tri- and tetra-methylol hydrocarbons and the ethylene oxide, propylene oxide, butylene oxide and other higher alkylene oxide condensation products, e.g., the ethylene oxide condensation products of the formula $$HO—CH_2CH_2(OCH_2CH_2)_mOH$$

where $m$ has a value of 0 to about 10 inclusive. Such esters include, for example, the poly-esters of acrylic, methacrylic or chloroacrylic acids and glycerol, trimethylol propane, trimethylol methane, pentaerythritol, etc.

In the acrylic portion of the ester, the nature of R is unimportant. It can be hydrogen, halogen, hydroxy, or substituted or unsubstituted saturated or unsaturated hydrocarbon. Preferably, R is hydrogen, halogen or lower alkyl, i.e. $C_1$ to $C_5$, because of the more ready availability of such acrylic acids. The halogens are chlorine, iodine, fluorine and bromine.

In the past, it had been found necessary to combine a limited class of catalytic agents which were usually hydroperoxides such as cumene hydroperoxide with a room temperature acrylic monomer in order to result in the desired effect of a shelf stable sealant that sets at room temperature when put in contact with closely faced metal surfaces.

SUMMARY OF THE INVENTION

This invention provides new and useful adhesive compositions of the class described, and, more specifically, provides a new use of a certain class of catalytic agents having the structural formula $XO[OYO]_nOZ$. In the formula $n$ is 0 or 1; X is selected from t-butyl and hydroxycyclohexyl, t-butyl being preferred; Y is the residue of an organic dicarboxylic acid having its atoms selected from carbon, hydrogen and oxygen; and Z is a hydrocarbon, hydroxyhydrocarbon, hydrocarbon ether or aliphatic acyl, having its atoms selected from carbon, hydrogen and oxygen with a carbon atom linked directly to the peroxy oxygen of the formula.

DESCRIPTION OF THE PREFERRED EMBODIMENTS

Examples of organic dicarboxylic acids are: phthalic, terephthalic, mellitic, malonic, malic, citric, maleic, oxalic, naphthalene dicarboxylic, cyclohexane dicarboxylic, mesaconic and octanedioic acid.

Examples of Z are: acetyl, melissyl, t-butyl, hydroxycyclohexyl, maleyl, methyl, eicosyl, dodecyl, stearoyl, hydroxyethyl, methoxyethyl, naphthenyl and benzoxyphenyl.

The use of catalysts having the above structure obviates the dependence upon hydroperoxides as catalytic agents in the described sealants. Among the catalysts tested are: di-t-butyl diperphthalate, t-butyl, peroxymaleic acid, di-t-butyl peroxide, bis (1-hydroxycyclohexyl) peroxide and t-butyl peracetate, hereinafter referred to as KDB, PMA, DBP, L–6 and L–7 respectively. The preferred catalysts are KDB, PMA and DBP, KDB being especially preferred.

In one preferred form of the present invention, stable organic hydrazides or rhodanine accelerators can be included in the sealant compositions. In another preferred form, organic amine and/or halo compound accelerators can be included in the sealant composition alone or together with the hydrazide and/or rhodanine. Briefly, and the hydrazides include ethyl carbazate, t-butyl carbazate and N-amino rhodanine, among many others. Usually these accelerators are used in amounts of 0.001% or less up to 5 to 10% or more.

In another preferred form of the present invention an organic imide accelerator can be included as a co-accelerator in the sealants of this invention either in the presence or absence of the above accelerators. The organic imide accelerators are those compounds which include in their structure at least one of the groups:

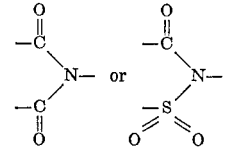

These include such organic imides of polycarboxylic acids as succinimide, phthalimide, maleimide, malonimide, citrimide, cyclohexyldicarboxylimide and N-butyl maleimide, and the sulfimides such as benzoic sulfimide. The imide co-accelerators can be used in very small amounts as low as 0.001 percent or less up to 5 percent or more.

To prepare the present sealant compositions, it is merely necessary to mix a suitable amount of accelerators and co-accelerators (where used) and peroxide catalyst with the selected room temperature reactive acrylic monomer or mixture of monomers. The use of accelerators and co-accelerators is permissible though not required. Metal containers should not be used because of the chance of premature polymerization. It has been found that the peroxide catalyst can be used in amounts of .001 to 20% or more and usually 0.1 to 3% in the sealant composition. The amount of accelerator and/or co-accelerator, if desired, may vary from 0.005 to 10 or more weight percent and an optimum can usually be found between 0.1 and 5 weight percent depending on the monomer system and catalyst used.

Inhibitors or stabilizers can be added as needed to balance or prevent instability of the sealant. Hydroquinone and its ethers, such as p-methoxy phenol are preferred inhibitors because of their availability and effectiveness to inhibit until the composition is put in use. Hydroquinone, or an ether thereof, in a total amount of 25 to 1,000 p.p.m., more usually 50 to 400 p.p.m., will probably be sufficient to stabilize most sealant compositions. Other conventional inhibitors or stabilizers for polymerization of vinyl compounds can be used as will be apparent to those in the art.

It is intended that other polymerizable unsaturated esters on other unsaturated monomers such as ethylenic hydrocarbons, ethers, or other comonomers, or plasticizers such as diisodecyl phthalate or the monobutyl ether of ethylene glycol, can be included in the present sealant compositions to modify the properties of the composition over a wide range of cure strengths so that a full line of sealants from very low strengths to very high strengths is provided.

The sealant compositions can also include, if desired, a minor amount, e.g., up to 50% of a low molecular weight polymer of an allyl ester of an aromatic polycarboxylic acid, hereinafter referred to as AP, which is soluble in and copolymerizable with the acrylic monomer. This has the effect of making liquid sealant more viscous. These compositions may be prepared by premixing the acrylic monomer and AP to provide a generally homogeneous mixture prior to the addition of the catalyst and accelerator. An AP having desirable characteristics is diallyl phthalate which can be obtained under the name "Dapon 35" from Food Machinery Corporation, having the following reported properties:

Bulk density _____ lbs./cu. ft__ 14–16
Sp. gr. at 25° C. _____ 1.267
Iodine number _____ 57
Softening range _____° C__ 85–115

The compositions of this invention are useful in adhering closely facing surfaces, usually metal, to each other. Close contact of the sealant composition with the metal surfaces apparently results in initiating the cure of the monomer by the catalyst and accelerator.

EXAMPLES

The following examples are offered for the purpose of illustration and are not intended as limiting the invention.

First, it will be more convenient to define and abbreviate certain chemical formulae that will be referred to in the test tables.

| Abbreviation | Name of Compound | Use |
|---|---|---|
| A | Ethoxyethoxyethoxypropylamine | Accelerator. |
| B | Hydroquinone | Inhibitor. |
| C | Polyethyleneglycoldimethacrylate | Monomer. |
| D | Saccharin | Promoter. |
| E | Ethylcarbazate | Accelerator. |
| F | Rhodanine | Do. |
| G | N-amino rhodanine | Do. |
| H | Dapon 35 | Prepolymer. |
| J | Carbontetrachloride | Accelerator. |
| K | t-Butyl carbazate | Do. |

The following tests were taken with the shown compound weight in parts by weight (pbw.). In each of these numbered examples 0.01 pbw. of B was used. Also, C was used as the monomer and H as the AP.

In each of these examples, the monomer in the amounts indicated in the table below were thoroughly mixed. The accelerator (where indicated) was added and mixed, followed by adding and mixing in the co-accelerator (where indicated) and then the catalyst.

| | Catalyst | | Promoters and Accelerators | | Monomer C Quan., pbw. | Prepolymer H Quan., pbw. |
|---|---|---|---|---|---|---|
| Example: | Substance | Quan., pbw. | Substance | Quan., pbw. | | |
| 1 | KDB | 0.5 | E | 0.1 | 100 | 0 |
| 2 | KDB | 1.5 | E | 0.1 | 100 | 0 |
| 3 | KDB | 1.5 | K | 0.1 | 100 | 0 |
| 4 | KDB | 1.5 | F | 0.1 | 100 | 0 |
| 5 | KDB | 1.5 | G | 0.1 | 100 | 0 |
| 6 | PMA | 1.5 | F | 0.1 | 100 | 0 |
| 7 | PMA | 1.5 | G | 0.1 | 100 | 0 |
| 8 | PMA | 0.5 | F | 0.1 | 100 | 0 |
| 9 | PMA | 0.5 | G | 0.1 | 00 | 0 |
| 10 | KDB | 3.0 | E | 0.3 | 100 | 0 |
| 11 | KDB | 3.0 | D<br>E | 0.3<br>0.3 | 100 | 0 |
| 12 | KDB | 3.0 | E<br>E | 0.3<br>0.3 | 100 | 0 |
| 13 | KDB | 3.0 | F<br>E | 0.3<br>0.3 | 100 | 0 |
| 14 | KDB | 3.0 | G | 0.3 | 100 | 0 |
| 15 | KDB | 3.0 | D | 0.3 | 100 | 0 |
| 16 | KDB | 3.0 | F | 0.3 | 100 | 0 |
| 17 | KDB | 3.0 | G<br>E | 0.3<br>0.3 | 100 | 0 |
| 18 | L-6 | 3.0 | D<br>E | 0.3<br>0.3 | 100 | 0 |
| 19 | L-6 | 3.0 | F | 0.3 | 100 | 0 |
| 20 | L-7 | 3.0 | D | 0.3 | 74 | 26 |
| 21 | L-7 | 1.5 | D | 0.3 | 74 | 26 |
| 22 | L-7 | 0.5 | D | 0.3 | 74 | 26 |
| 23 | KDB | 3.0 | D | 0.3 | 74 | 26 |
| 24 | KDB | 1.5 | D | 0.3 | 74 | 26 |
| 25 | KDB | 0.5 | D | 0.3 | 74 | 26 |
| 26 | PMA | 3.0 | D | 0.3 | 74 | 26 |
| 27 | PMA | 1.5 | D | 0.3 | 74 | 26 |
| 28 | PMA | 0.5 | D | 0.3 | 74 | 26 |
| 29 | L-6 | 3.0 | D | 0.3 | 74 | 26 |
| 30 | L-6 | 1.5 | D | 0.3 | 74 | 26 |
| 31 | L-6 | 0.5 | D | 0.3 | 74 | 26 |

The formulations of Examples 1 through 31 were subjected to the "finger-tight" locking test. Accordingly, three small drops of each formulation were applied on the exposed threads of a series of separate degreased ⅜–24, 1 inch medium carbon steel cap screw on each of which a degreased medium carbon steel nut had been threaded up close to the cap screw head. The nut was then backed off until it was wtihin the area of threads to which the composition had been dispensed. The cap screw was then placed head down on a level surface and allowed to stand. A different nut of the series was checked after lapse each sequential period of time, usually about 30 minutes, and when a nut was found which could not be turned on the screw by hand, the time was recorded. This time is reported in the table below as FT time in minutes.

Accelerated shelf life tests were also coinducted on samples of Examples 1 through 31 in order to determine the storage stability of representative compositions. In accordance with the test procedure, each composition, in its polyethylene bottle, was aged in an oven maintained at about 82° C., and checked every 30 minutes. The test is an accelerated aging test and, as a correlation of the test procedure with actual storage conditions, a sealant composition free from gelling after 30 minutes under the aging conditions of the test will also be free from gelling under ambient or room temperature for at least one year. The test results shown in the table below reveal the last check in which the composition had not gelled.

Additional cap screws were prepared as in the finger-tight test above for Examples 1 through 28 for the purpose of testing the strength of the bonds between the nuts and cap screws after 24 hours. After one day, the head of the appropriate cap screw was held in a vise with the shank of the cap screw disposed vertically. A torque wrench was applied to the nut, and the torque in inch pounds required to dislodge the nut was measured and is reported in the table below.

The results of the "finger-tight" (FT), 24 hour cure (24 hr.) and stability (82° C.) tests are as follows:

TEST RESULTS

| Example: | FT, Minutes | 24-Hr. Torque FT, 24-Hr. | 82° C., Stability |
|---|---|---|---|
| 1 | 40 | 114 | 8 hours. |
| 2 | 20 | 152 | Do. |
| 3 | 25 | 152 | Do. |
| 4 | 25 | 290 | Do. |
| 5 | 25 | 106 | Do. |
| 6 | 50 | 240 | Do. |
| 7 | 30 | 110 | Do. |
| 8 | 50 | 220 | Do. |
| 9 | 50 | 54 | Do. |
| 10 | 20 m. < | 216 | 5 hours. |
| 11 | 0–240 m. | 192 | Do. |
| 12 | 20 m. < | 309 | Do. |
| 13 | 20 m. < | 167 | Do. |
| 14 | 20 m. < | 177 | Do. |
| 15 | 60 m. | 305 | Do. |
| 16 | 40 m. | 273 | 60 minutes. |
| 17 | 20 m. < | 177 | 5 hours. |
| 18 | 30 m. | 279 | 60 minutes. |
| 19 | 20 m. < | 185 | 30 minutes. |
| 20 | 275 | 264 | 8 hours. |
| 21 | 270 | 276 | Do. |
| 22 | [1] 0–270 | 264 | Do. |
| 23 | 90 | 240 | Do. |
| 24 | 90 | 264 | Do. |
| 25 | 120 | 276 | Do. |
| 26 | 105 | 240 | Do. |
| 27 | 120 | 312 | Do. |
| 28 | 200 | 300 | Do. |
| 29 | 30 | 324 | [2] |
| 30 | 45 | 324 | [2] |
| 31 | 75 | 276 | [2] |

[1] Not FT after 270 min.
[2] Not available.

As additional examples of suitable formulations, the above examples are repeated except that the monomer or monomers are replaced with polyethylene glycol diacrylate, tetrahydrofurfuryl chloracrylate, dimethyl aminoethyl methacrylate, butylaminoethyl methacrylate, or other room temperature curing acrylic monomers or mixture of such monomers.

The sealant compositions of this invention can be used to bond similar or dissimilar metal surfaces. The surfaces are usually ferrous metal surfaces, although the compositions are useful in bonding such other materials as brass, copper and tin. Zinc and cadmium, used as corrosion-resistant coatings on other metals, are less active metals and may require the use of a primer to activate the metal before applying the sealant. Such primers are available commercially.

Many advantages of the present sealant composition have been discussed above; briefly, there is provided a sealant composition which is shelf stable for an extended period of time but which sets up when closely contacted or confined between metal surfaces. The sealant compositions are receptive of and compatible with a variety of addition agents, including a full range of plasticizers, e.g., esters of phthalic acid, waxy plasticizers, etc., thixotroping agents such as silica gel, e.g., Cab-O-Sil, and a variety of other monomers and soluble polymers.

All percentages and parts given herein are percentages and parts by weight unless otherwise indicated.

The foregoing detailed description is given for clearness of understanding only and no unnecessary limitations are to be understood therefrom, as some modifications will be obvious to those skilled in the art.

I claim:

1. A liquid sealant composition which is relatively stable under room temperature conditions in isolation from contact with metal surfaces and comprising a room temperature reactive liquid acrylic ester monomer consisting essentially of a monomer selected from the class consisting of di-, tri- and tetraesters of an acrylic acid and a polyhydric alcohol, acrylic esters of cyclic ether alcohols, acrylic esters of amino alcohols and mixtures thereof, and a peroxidic initiator having the structural formula $XO(OYO)_nOZ$, where: $n$ is 0 or 1; X is selected from t-butyl and hydroxy cyclohexyl; Y is the residue of an organic dicarboxylic acid having its atoms selected from carbon, hydrogen, and oxygen; Z is a hydrocarbon, hydroxy cyclohexyl, hydrocarbon ether or the termination of an aliphatic acyl of Y, having its atoms selected from carbon, hydrogen and oxygen with a carbon atom linked directly to the peroxy oxygen of the formula, in an amount sufficient to initiate polymerization of said monomer at room temperature on confinement of said sealant between closely facing metal surfaces without adversely affecting storage stability.

2. The composition of claim 1 wherein said peroxidic initiator is di-t-butyl diperphthalate.

3. The composition of claim 1 containing an accelerator for room temperature cure.

4. The composition of claim 1 wherein the amount of said peroxidic initiator is within the range of 0.01 to 20 percent by weight.

5. The composition of claim 1 wherein said polyhydric alcohol is an alkylene oxide condensation product.

6. The composition of claim 1 wherein said acrylic ester monomer is an acrylic ester of a cyclic ether alcohol.

7. The composition of claim 6 wherein said cyclic ether alcohol is tetra-hydrofurfuryl alcohol.

8. The composition of claim 1 wherein said acrylic ester monomer is an acrylic ester of an amino alcohol.

9. The composition of claim 1 wherein Z is hydroxy hydrocarbon and $n$ is 0.

10. The composition of claim 1 wherein Z is aliphatic acyl and $n$ is 0.

11. The composition of claim 1 wherein Z is hydrocarbon and $n$ is 1.

12. The composition of claim 1 wherein said peroxidic initiator is t-butyl peroxymaleic acid.

13. The composition of claim 1 wherein said peroxidic initiator is di-t-butyl peroxide.

14. The composition of claim 1 wherein said peroxidic initiator is bis(1-hydroxycyclohexyl) peroxide.

15. The composition of claim 1 wherein said peroxidic initiator is t-butyl peracetate.

16. A laminate structure comprising separate members having closely facing ferrous metal surfaces and a layer of the composition of claim 1 set between said surfaces and securing said members as a unit.

17. A method of adhering closely facing metal surfaces, which method comprises interposing between said surfaces the liquid composition of claim 1 and permitting said surfaces to stand at ambient conditions until said composition is set.

References Cited

UNITED STATES PATENTS

| 2,268,611 | 1/1942 | Mitchell | 260—89.5 |
| 2,403,758 | 7/1946 | Rust. | |
| 2,464,826 | 3/1949 | Neher et al. | 260—86.1 |
| 2,698,863 | 1/1955 | Dickey | 260—86.1 |
| 2,813,127 | 11/1957 | White. | |
| 2,833,753 | 5/1958 | Lal. | |
| 3,046,262 | 7/1962 | Krieble | 260—89.5 |
| 3,234,194 | 2/1966 | Slocum. | |
| 3,249,656 | 5/1966 | Kalinowski | 260—89.5 |

HARRY WONG, Jr., Primary Examiner